United States Patent [19]
Reitmeier et al.

[11] Patent Number: 6,057,889
[45] Date of Patent: May 2, 2000

[54] FORMAT-RESPONSIVE VIDEO PROCESSING SYSTEM

[75] Inventors: Glenn A. Reitmeier, Yardley, Pa.; Steven A. Steckler, Clark, N.J.

[73] Assignee: Sarnoff Corporation, Princeton, N.J.

[21] Appl. No.: 09/001,620

[22] Filed: Dec. 31, 1997

Related U.S. Application Data

[60] Provisional application No. 60/060,112, Sep. 26, 1997.

[51] Int. Cl.[7] .................................................. H04N 5/46
[52] U.S. Cl. .......................... 348/555; 348/557; 348/558; 348/725; 348/726; 348/727
[58] Field of Search .................... 348/555, 557, 348/558, 725, 726, 727

[56] References Cited

U.S. PATENT DOCUMENTS

| | | | |
|---|---|---|---|
| 5,146,331 | 9/1992 | Tsuchida | 359/169 |
| 5,262,854 | 11/1993 | Ng | 358/133 |
| 5,374,962 | 12/1994 | Klink | 348/557 |
| 5,475,442 | 12/1995 | Matsushita et al. | 348/554 |
| 5,485,216 | 1/1996 | Lee | 348/443 |
| 5,614,952 | 3/1997 | Boyce et al. | 348/392 |
| 5,635,985 | 6/1997 | Boyce et al. | 348/402 |
| 5,764,805 | 6/1998 | Martucci et al. | 382/238 |

*Primary Examiner*—Andrew I. Faile
*Assistant Examiner*—Sam Huang
*Attorney, Agent, or Firm*—William J. Burke

[57] ABSTRACT

A video processing system that automatically adjusts video processor parameters depending upon the format of a received video signal in, e.g., a television receiver capable of receiving a multiplicity of video formats.

25 Claims, 4 Drawing Sheets

FORMAT-RESPONSIVE VIDEO PROCESSING SYSTEM

The invention claims benefit of U.S. Provisional Application No. 60/060112, filed Sep. 26, 1997 and incorporated herein by reference in its entirety.

This application is related to U.S. patent application Ser. No. 09/001,596, filed on the same date as the present application.

This application is related to U.S. patent application Ser. No. 09/001,952, filed on the same date as the present application.

The invention relates to television receivers generally, and more particularly, a format-responsive video processing system suitable for use in a television receiver capable of receiving ATSC-like television signals.

BACKGROUND OF THE DISCLOSURE

Present television receivers, such as NTSC (National Television Standards Committee) television receivers, include video processing circuitry that typically must process a video signal conforming to only a single, predetermined video format. To optimize the picture produced by such a television receiver, various parameters within the receiver are adjusted. Some of the adjusted parameters, such as gamma correction, colorimetry correction and the like, are related to characteristics of the camera producing the television signal. Some of the adjusted parameters, such as luminance peaking, black stretch and the like, are related to characteristics of a display device used to display a video signal produced by the video processing circuitry. In any event, since the predetermined video format does not change, the adjusted parameters are typically adjusted to a nominal value once at the factory. Thereafter, the television receiver produces an acceptable picture that may be further adjusted to conform to a particular viewer's sensibilities.

Future digital television (DTV) receivers are expected to be implemented substantially in accordance with the transmission standards established by the Advanced Television Standards Committee (ATSC). A similar standard is the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference.

The new DTV standards allow broadcasters to deliver virtually any format up to 1920×1080 pixels. As such, DTV receivers must be capable of receiving and processing a multiplicity of video formats. Therefore, a need exists in the art for a television receiver that is capable of receiving a multiplicity of formats and automatically adjusting video and other processing parameters depending upon the format of a particular received signal. Specifically, a need exists for a video processing system suitable for use in such a multiple format television receiver.

SUMMARY OF THE INVENTION

The invention is a video processing system that automatically adjusts video processor parameters depending upon the format of a received video signal in, e.g., a television receiver capable of receiving a multiplicity of video formats.

Specifically, the invention comprises a video decoder, for decoding a compressed video stream to produce a decoded video signal and a header information signal, wherein the header information signal includes picture format indicium; a controller, coupled to the video decoder, for producing a control signal in response to the header information signal; and a video processing circuit, coupled to the video decoder and the controller, for processing the video signal according to a plurality of processing parameters to produce an output video signal, wherein the video processing circuit, in response to the control signal, modifies at least one of the processing parameters.

The invention optionally includes a colorimetry processor that generates a colorimetry indicium in response to a statistical determination based upon, e.g., changes in fleshtone information within a video signal. The colorimetry processor is operable upon baseband or compressed video chrominance components.

BRIEF DESCRIPTION OF THE DRAWINGS

The teachings of the present invention can be readily understood by considering the following detailed description in conjunction with the accompanying drawings, in which.

DETAILED DESCRIPTION

The invention will be described within the context of a digital television (DTV) receiver, illustratively an ATSC television receiver. However, it will be apparent to those skilled in the art that the invention is applicable to any receiver of segmented information streams, such as DVB, MPEG-1, MPEG-2 and other information streams.

Figure 1:
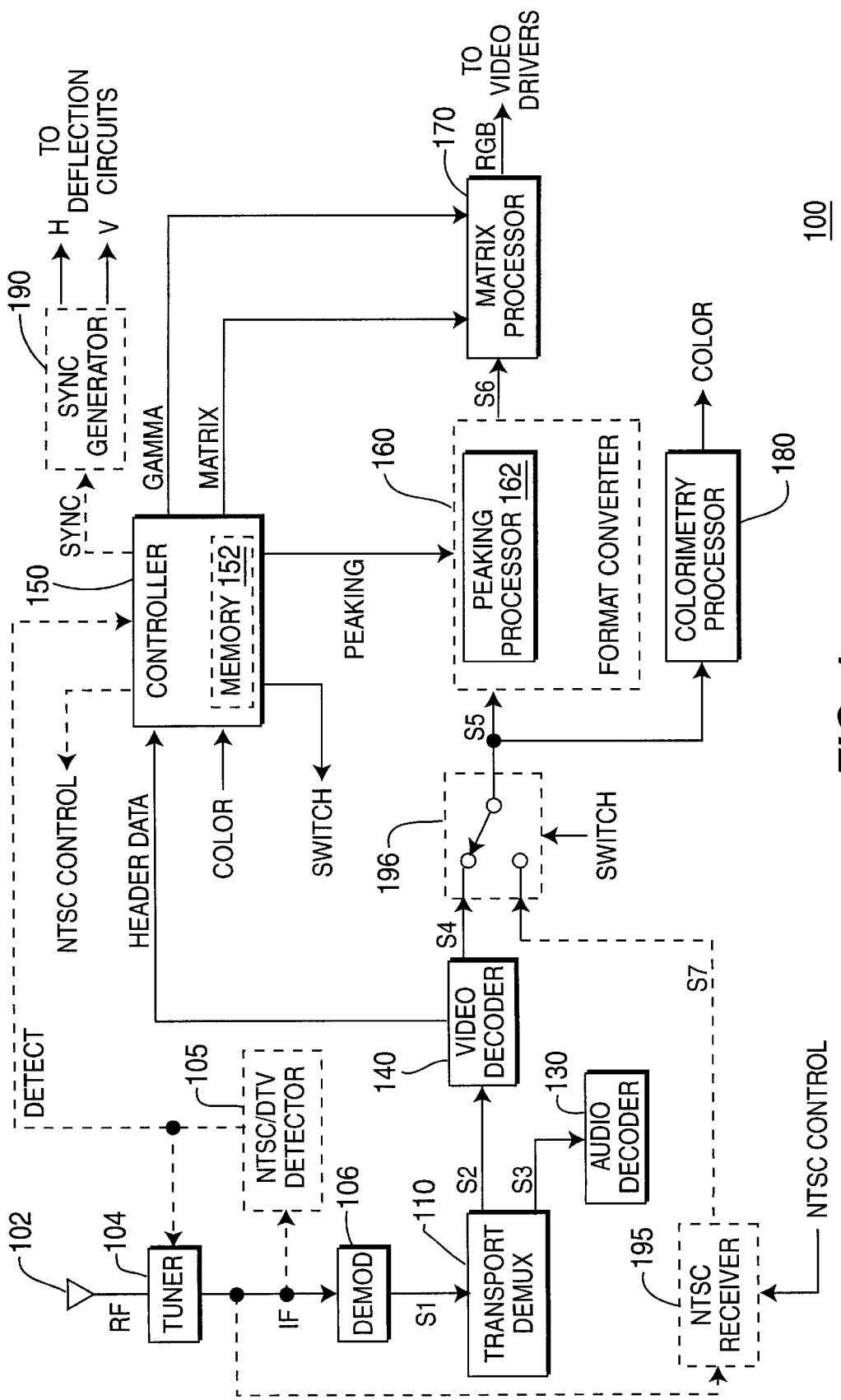
FIG. 1 shows a block diagram of a digital television (DTV) receiver including video processing apparatus according to the invention.

FIG. 1 shows high-level block diagram of a DTV receiver 100 according to the invention. An RF source 102 (illustratively, an antenna or cable television distribution network), provides a radio frequency (RF) signal RF comprising a plurality of television signals modulated according to a vestigial sideband (VSB), quadrature amplitude modulation (QAM) or other suitable modulation scheme. The provided RF television signals are coupled to a tuner 104, that downconverts a desired television signal to produce an intermediate frequency (IF) television signal IF. A demodulator 106, illustratively a VSB or QAM demodulator, demodulates the IF television signal IF to produce a digital information stream S1, illustratively an MPEG-like system stream S1 containing one or more MPEG-like transport streams.

The MPEG-like transport streams are analogous to NTSC channels, in that each transport stream typically transports the video and audio portions of a single program, such as a movie or other audio-visual program. Each transport stream comprises a plurality of elementary streams associated with the video and audio portions of the transported audio-visual program.

A transport demultiplexer 110 operates in a known manner to extract a particular transport stream from the MPEG-like system stream S1. Elementary audio stream(s) S3 associated with the extracted transport stream are coupled to an audio decoder 130 for decoding prior to processing by an audio driver circuit (not shown). Elementary video stream(s) S2 associated with the extracted transport stream are coupled to a video decoder 140.

Video decoder 140, illustratively an MPEG decoder, decodes the video stream S2 to produce a decoded video signal S4 and a header data signal HEADER DATA. The decoded video signal S4 is coupled to a peaking processor 162 and a colorimetry processor 180 via an optional switch 196 as video signal S5. The header data signal HEADER DATA is coupled to a controller 150. Controller 150 is used to control various processing parameters of DTV receiver 100, as will be explained in detail below.

Peaking processor 162 is used to emphasize high frequency luminance information within the video signal S5 to increase the apparent sharpness of a picture produced using that signal. Such high frequency luminance information may be representative of, e.g., the edges of various objects within a picture. The amount of emphasis is controlled by a control signal PEAKING produced by the controller 150. Peaking processor 162 produces an output video signal S6 that is coupled to a matrix processor 170. Peaking processor 162 will be described in more detail below with respect to FIG. 2.

Matrix processor 170 performs color matrix and gamma processing operations on the video signal S6 to produce red R, green G and blue B color signals. The three color signals are coupled, via the RGB signal path, to a display device (not shown), where each color difference signal will be used to drive, e.g., an associated electron gun in a picture tube. Matrix processor 170 will be described in more detail below.

Colorimetry processor 180 is used to gather statistical information from chrominance portions of a video signal to determine the colorimetry of the source of the video signal. Colorimetry information comprises the combination of color primaries, transfer characteristics, and matrix coefficients used to generate the color portion of the video signal. The source colorimetry information is coupled to controller 150 via a colorimetry indicium signal COLOR. The controller 150 utilizes the colorimetry indicium signal COLOR to control color processing of video signal S5 such that a desired color processing result may be achieved. Colorimetry processor 180 will be described in more detail below.

DTV receiver 100 optionally includes a standard (i.e., analog) television receiver portion, illustratively an NTSC receiver 195 and an NTSC/DTV detector 105. NTSC receiver 195 receives the RF signal from antenna 102 and, in response to a control signal NTSC CONTROL from the controller 150, tunes and demodulates a selected analog television channel to produce a standard video signal. The standard video signal is processed to produce an output video signal S7 that is coupled to switch 196. The standard video signal may be subjected to an analog luminance and chrominance separation process to produce analog component luminance (Y) and chrominance (Cr, Cb) signals. If peaking processor 160 comprises an analog peaking processor, then the analog component signals (Y, Cr, Cb) may be coupled directly to switch 195. If peaking processor 160 comprises a digital peaking processor, then the analog component signals (Y, Cr, Cb) are digitized by an analog to digital (A/D) converter (not shown) and coupled to switch 196. Alternatively, the standard video signal may be digitized by an analog to digital converter (not shown) prior to a digital luminance and chrominance separation process.

Optional NTSC/DTV detector 105 is used to detect and indicate, via an output signal DETECT, the presence of, e.g., an NTSC picture carrier at the tuned IF frequency. If an NTSC picture carrier is not detected at the tuned IF frequency, but a signal level exceeding a threshold level is detected, then the signal at the tuned IF frequency is probably a DTV signal. The output signal DETECT is shown as being coupled to the tuner 104 and the controller 150. Tuner 104 may utilize the NTSC detection signal DETECT by, e.g., adjusting various tuning parameters to optimally tune an NTSC (or DTV) signal, thereby increasing the signal to noise ratio of the resulting IF signal. Controller 150 may utilize the NTSC detection signal DETECT by, e.g., adjusting the processing parameters of the peaking processor 160 and the matrix processor 170. It must be noted that while optional NTSC/DTV detector 105 is shown as being separate from the NTSC receiver 195, the NTSC/DTV detector 105 may easily be incorporated into the optional NTSC receiver 195.

In an NTSC mode of operation, controller 150 causes video signal S7 to be coupled to the peaking processor 162 and colorimetry processor 180 via optional switch 196 as video signal S5. In the NTSC mode of operation, controller 150 also adjusts the operation of peaking processor 162 and matrix processor 170 via the control signals PEAKING, MATRIX and GAMMA. The adjustments to the peaking processor 162 and matrix processor 170 provide peaking, color matrix and gamma corrections suitable to an NTSC-derived video signal.

DTV receiver 100 optionally includes a synchronizing signal generator 190. Sync generator 190 produces horizontal H and vertical V synchronizing signals that are coupled to deflection circuitry (not shown) associated with a display device. Sync generator 190, in response to a control signal SYNC from the controller 150, adjusts the timing characteristics of the horizontal H and vertical V synchronizing signals. For example, in the NTSC mode of operation, controller 150 causes sync generator 190 to adjust the horizontal H and vertical V synchronizing signals to correspond to the standard (e.g., NTSC) timing requirements. Alternatively, the horizontal H and vertical V synchronizing signals are appropriate for the native display format, and the format of the video signal S5 is converted to the native display format by the format converter 160.

To optimally practice the invention, it is desirable to determine both the format and the colorimetry of the video signal S5 to be processed. It is also desirable to determine the supported video formats, and other characteristics (e.g., interlaced, non-interlaced, widescreen, resolution and the like), of display device that will be used to display the processed video signal RGB. In the case of a television receiver including an integrated display device (i.e., a consumer television "set"), information relating to the type of display device is known and, therefore, "hard coded" into the controller and the video processing system as a whole (e.g., used to pre-calculate the parameters in the filter coefficient storage unit 162-4 of peaking processor 160). In the case of a television receiver not including an integrated display device (i.e., a component video system), information relating to the type of display device maybe stored in, e.g., an optional memory unit 152 within the controller 150. Such display information may, of course, be modified by a user via, e.g., a remote control device (not shown).

Video decoder 140 decodes the video stream S2 to produce a decoded video signal S4 and a header data signal HEADER DATA Video decoder 140 examines the sequence header of video stream S2 to determine the format and, if available, colorimetry information of the video signal encoded within video stream S2. Upon examining the sequence header, video decoder 140 couples the format and colorimetry information to controller 150 as the header data signal HEADER DATA. The format and colorimetry information will now be described.

The DTV receiver 100 of FIG. 1 is capable of receiving source video comprising image sequences that vary in spatial resolution (480 lines, 720 lines, or 1080 lines), in temporal resolution (60 fps, 30 fps, or 24 fps), and in scanning format (2:1 interlaced or progressive scan). The ATSC recommended compression formats are shown below in Table 1.

TABLE 1

| Active Lines | Active Pixels | Aspect Ratio | Picture Rate |
| --- | --- | --- | --- |
| 1080 | 1920 | 16:9 | 60I, 30P, 24P |
| 720 | 1280 | 16:9 | 60P, 30P, 24P |
| 480 | 704 | 16:9 and 4:3 | 60P, 60I, 30P, 24P |
| 480 | 640 | 4:3 | 60P, 60I, 30P, 24P |

The compression format of an ATSC-compliant video stream is determined by examining the sequence headers in the video elementary stream S2. Specifically, the video decoder 140 examines the sequence_header( ) to identify variables such as the descriptively named horizontal_size, vertical_size, frame_rate_code and aspect_ratio_ information variables. The format-related information retrieved by the video decoder 140 is coupled to the controller 150 as part of the signal HEADER DATA. The use of such information by the controller 150 will be discussed below.

The ATSC recommended standardized video input formats are shown below in Table 2. Each of the video standards shown in Table 2 has associated colorimetry parameters. That is, video signals generated according to a particular video standard use the same combination of color primaries, transfer characteristics, and matrix coefficients associated with the particular video standard. The ATSC Standard specifies Society of Motion Picture Television Engineers (SMPTE) standard 274M colorimetry as the default, and preferred, colorimetry. Video inputs corresponding to ITU-R BT.601-4 may have SMPTE 274M colorimetry or SMPTE 170M colorimetry. The colorimetry information identifies normative color characteristics of the video signal such that color information may be accurately reproduced when the video signal is subsequently displayed on a display device.

TABLE 2

| Video Standard | Active Lines | Active Samples/Line |
| --- | --- | --- |
| SMPTE 274M | 1080 | 1920 |
| SMPTE S17.392 | 720 | 1280 |
| ITU-R BT.601-4 | 483 | 720 |

The colorimetry of an ATSC-compliant video stream is determined by examining an optional extension to the sequence headers in the video elementary stream S2. Specifically an optional sequence_display_extension( ) may include variables that indicate (1) the original video format (video_format), such as component, NTSC, PAL and the like; (2) the chromaticity coordinates of the source primaries (color_primaries), such as the source coding color standard and associated reference white levels and color difference levels; (3) the gamma of the original video (transfer_ characteristics), the color matrix coefficients for transforming red, green and blue primaries to Y, Cb and Cr values (matrix_coefficients). If the video elementary stream S2 does not include a sequence_display_extension( ), then SMPTE 274M colorimetry is typically, though not always correctly, assumed.

Figure 2:
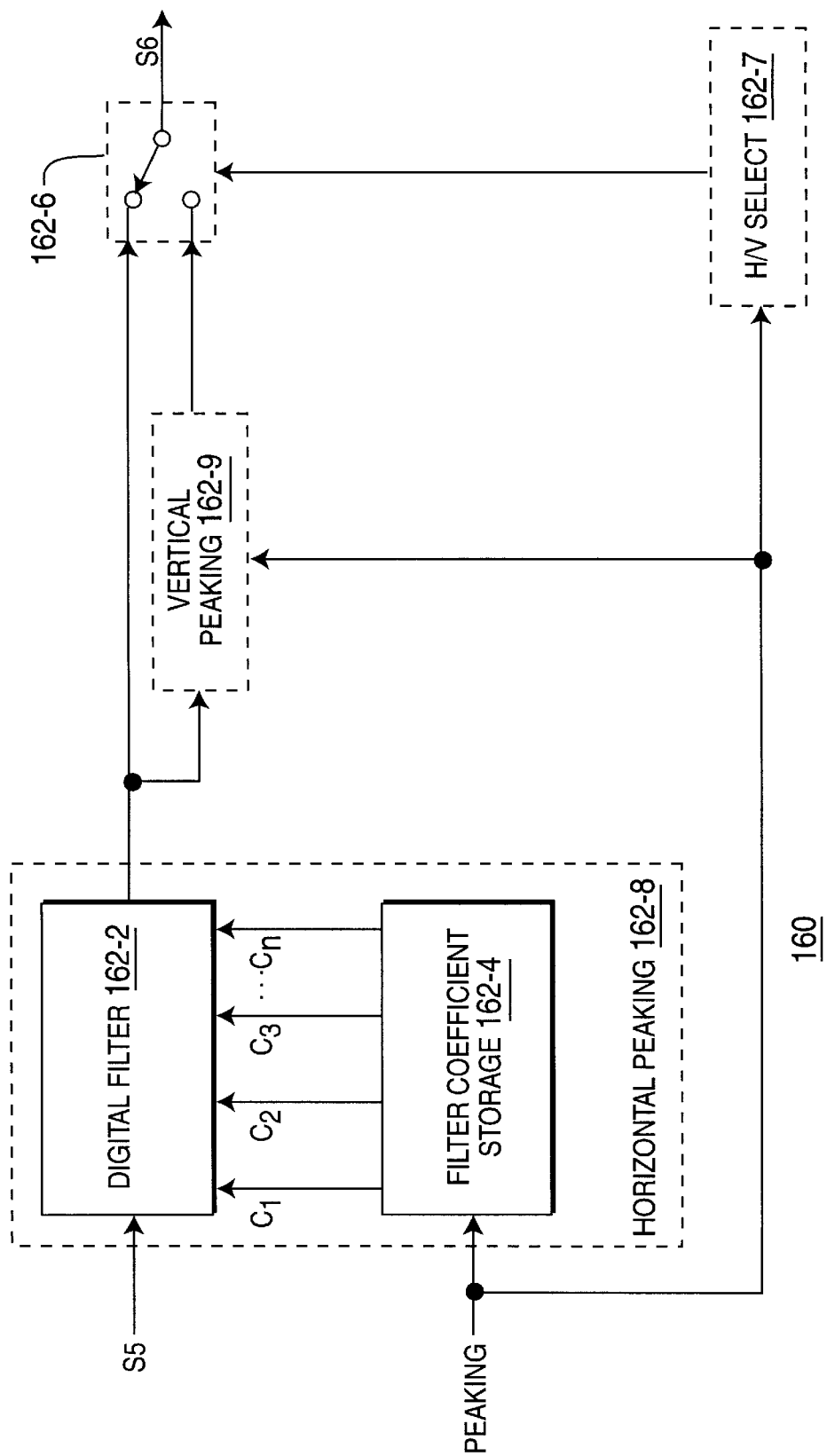
FIG. 2 shows a block diagram of a peaking processor suitable for use in the DTV receiver of FIG. 1.

FIG. 2 shows a block diagram of a peaking processor suitable for use in the DTV receiver of FIG. 1. As previously mentioned, peaking processor 162 is used to emphasize high frequency luminance information within video signal S5 to increase the apparent sharpness of a picture produced using that signal. The amount of emphasis is controlled by a control signal PEAKING produced by the controller 150. Specifically, in the exemplary embodiment of FIG. 2, peaking processor 162 includes a horizontal peaking unit 162-8. Horizontal peaking unit 162-8 comprises a digital filter 162-2 and a coefficient storage unit 162-4. Digital filter 162-2 may be of a known type, such as finite impulse response (FIR), infinite impulse response (IIR) and the like. Digital filter 162-2 filters, according to a high frequency emphasis transfer function determined by a set of filter coefficients $C_1$–$C_n$ stored in coefficient storage unit 162-4, video signal S5 to produce a output video signal S6. Coefficient storage unit 162-4, in response to a control signal PEAKING from controller 150, couples a predetermined set of filter coefficients $C_1$–$C_n$ to digital filter 162-2. Thus, controller 150 adjusts the amount of peaking applied video signal S5, which correspondingly adjusts the apparent sharpness of a picture produced using video signal S6.

Peaking processor 160 optionally included a vertical peaking unit 162-9, a horizontal/vertical selection unit 162-7 and a switch 162-6. Vertical peaking unit 162-9 receives the output signal of horizontal peaking unit 162-8 and, in response to the control signal PEAKING from controller 150, imparts to the received output signal a controllable degree of vertical peaking. Vertical peaking unit 162-9 includes a digital filter and filter coefficient storage unit similar to that described above with respect to horizontal peaking unit 162-8, but with line delays instead of pulse delays.

Selection unit 162-7 retrieves peaking selection information optionally included in the control signal PEAKING by the controller 150, and responsively controls selector switch 162-6. In a horizontal peaking mode of operation, selector switch 162-6 couples the output signal of horizontal peaking unit 162-8 to a switch output as video signal S6. In the case in which vertical peaking is also applied, selector switch 162-6 couples the output signal of vertical peaking unit 162-9 to a switch output as video signal S6.

The horizontal peaking unit 162-8 is used to emphasize high frequency luminance information on an intra-line (e.g., pixel to pixel within a line) basis. By contrast, the vertical peaking unit 162-9 is used to emphasize high frequency luminance information on an inter-line (e.g., pixel to pixel between two or more lines) basis. Vertical peaking is generally inappropriate when processing an interlaced video signal, since the effect is to emphasize information that results in "inter-line flicker" artifacts when the video signal is displayed.

In the case of an video signal S5 being an interlaced video signal, controller 150 causes peaking processor 160 to utilize only horizontal peaking functions, thereby avoiding the emphasis of "inter-line flicker" artifacts. In the case of video signal S5 being a progressive scan video signal, controller 150 causes peaking processor 160 to impart horizontal peaking functions and, optionally, vertical peaking functions. Moreover, the amount of peaking, both horizontal and (if used) vertical, is controlled by controller 150 in response to the particular format of the video signal being processed. Optionally, even with interlaced scanning, a small amount of vertical peaking may be applied.

The peaking processor 162 described above is implemented as a separate, or stand-alone peaking circuit. However, the peaking processor 162 may also be implemented as part of a format conversion filtering circuit 160 that is used to convert the various transmitted formats to a "native format" of the display device. The format converter 160 may perform several format processing fictions in addition to the peaking function. Moreover, the peaking processor 162 may operate in the digital domain as a digital filter having appropriate coefficients selected or loaded (as shown in FIG. 2 and described above), or in the analog domain by appropriately controlling an analog circuit after digital to analog (D/A) conversion of the video signal.

The DTV receiver 100 of FIG. 1 produces an RGB signal suitable for use in a display device (not shown). The display device may be a high resolution display (e.g., 1920×1080 format), a low resolution display (e.g., 640×480 format) or a medium resolution display. Moreover, the display device may be an interlaced or non-interlaced (progressive scan) device. As previously discussed, it will be assumed that information regarding the type of display device used is stored in controller 150.

In the case of a receiver having a high resolution widescreen display, such as a 1920×1080 format display, a 1920×1080 format video signal will produce a very sharp, high-resolution picture. However, when a 1280×720 format video signal is provided, the displayed picture will be noticeably reduced in sharpness. The picture sharpness will be further reduced when a 640×480 format video signal is displayed. To increase the apparent sharpness of lower resolution format video signals displayed upon a higher resolution display, peaking processor 162 is used to selectively apply increasing amounts of luminance transition emphasis to video signals having decreasing levels of resolution.

The amount of peaking that should be applied to video signal S5 is determined by controller 150 with respect to the format of video signal S5, and format of the display device. Specifically, the controller 150 compares the format of the display device to the format of the video signal. If the display device format matches the video signal format, then little or no peaking beyond a default level of peaking is applied. If the display device format is greater than the video signal format, then the amount of peaking applied to the video signal S5 is increased as the resolution of the video signal (i.e., the format) decreases below the native resolution of the display device. For example, if the display device is a very high resolution display device (e.g., 1920×1080 format), then increasing degrees of peaking are used when video signal S5 comprises, respectively, a 1280×720, 704× 480, 640×480 and 704×480 (i.e., widescreen) format. In this manner the luminance peaking operations are adjusted in response to changes in the format of the received video signal, thereby maximizing the apparent sharpness of displayed pictures for each format in a multiple format environment.

Referring to FIG. 1, matrix processor 170 performs the color conversion processing (matrix coefficients, transfer characteristics and color primaries) needed to convert the transmitted Y, Cr, Cb color components to the R, G and B, signals needed for display. As previously described, the colorimetry information associated with the video signal S5 is determined by examining the sequence header of video elementary stream S2. Controller 150, in response to colorimetry information included in the signal HEADER DATA, adjusts the parameters of the MATRIX and GAMMA control signals that are used to adjust, respectively, the color matrix and gamma correction operations of matrix processor 170. In this manner the color matrix and gamma operations are adjusted in response to changes in the colorimetry information of the received video signal, thereby ensuring correct colorimetry processing in a multiple format environment.

The above-described colorimetry information retrieval and processing assumes that video elementary stream S2 is an ATSC-compliant video elementary stream (or other DTV elementary information stream). Moreover, it is assumed that video elementary stream S2 includes appropriate colorimetry information within the sequence header portions of the stream. Unfortunately, such information may not always be present. For example, the colorimetry information may not be present in the video elementary stream S2 (e.g., optional NTSC receiver 195 is selected as the source of video signal S5), or the colorimetry information that is present in the elementary video stream S2 may be incorrect or incorrectly assumed to be the default colorimetry format.

It is important to note that the colorimetry of high-definition(e.g., SMPTE 274M) cameras is different from that of NTSC cameras. Video signals produced by either camera are subsequently converted to ATSC-like video streams and transmitted, along with accompanying colorimetry information, to users. As previously described, the colorimetry information is retrieved and used to adjust the color matrix and gamma characteristics of video signal prior to display.

If all sources were captured with high definition cameras and down-converted to standard definition television (SDTV) resolution, perfect color would be ensured when the resulting video was displayed on a standard definition display device. Similarly, if NTSC originated sources were decoded back to the original R, G and B and re-processed with the proper high definition color matrix, perfect color would be ensured when the resulting video was displayed on a high definition display device. However, since such conversions do not always take place, non-color corrected video signals may be received. Therefore, in ATSC-like receivers, the colorimetry field can be examined and used to control the color matrix. In the case of a digital matrix processor, different coefficients are loaded or selected; in the case of an analog matrix processor, different resistance values are created or selected.

Another problem associated with proper color conversion is the improper use of the color field by broadcasters. Such improper use can occur where broadcasters use NTSC source video without appropriate color encoder control, upconvert NTSC source video to a higher resolution format that is incorrectly assumed to have high definition colorimetry, and other situations. Thus, it may be necessary to retrieve the correct colorimetry information from a video signal having improperly coded (or uncoded) colorimetry information.

Figure 3:
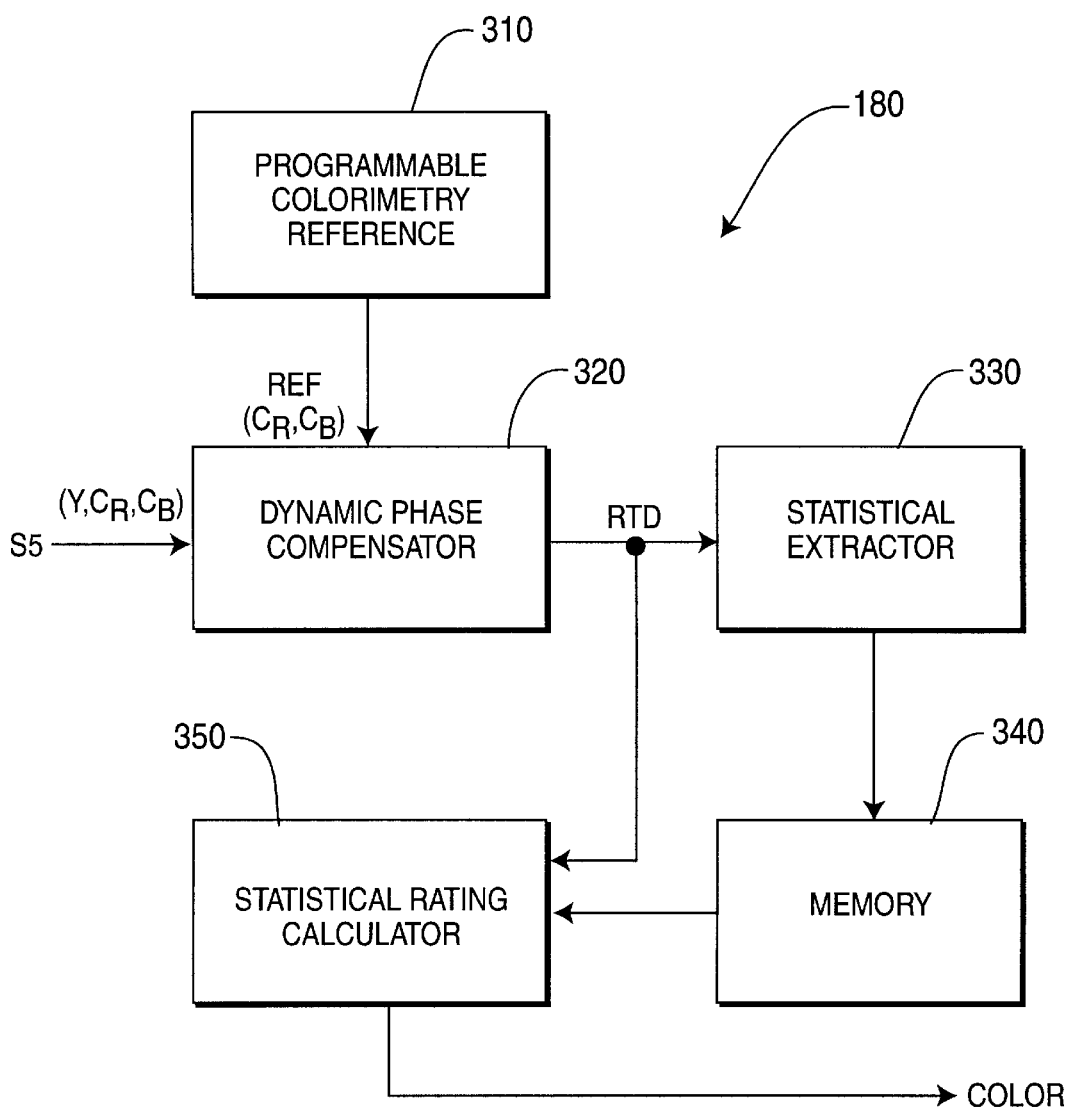
FIG. 3 shows a high level block diagram of a colorimetry processor suitable for use in the DTV receiver of FIG.

FIG. 3 shows a block diagram of a colorimetry processor 180 suitable for use in the DTV receiver 100 of FIG. 1. The colorimetry processor 180 determines the source colorimetry of video signal S5 by statistical processing of, e.g., the decoded Cr and Cb color signals. For example, since a high occurrence of flesh tones exists in typical television content, one embodiment of colorimetry processor 180 utilizes the color parameters known to be associated with such flesh-tones to detect a color shift in the video signal S5. The detected video shift is conveyed to controller 150, where a comparison is made to fleshtone information from previously processed video signals. Colorimetry processor 180 may also derive statistical information from Cr and Cb pixel level data from the DC coefficients of the Cr and Cb discrete cosine transfer (DCT) blocks prior to an inverse DCT computation in the video decoder 140.

Specifically, the exemplary embodiment of colorimetry processor 180 comprises a programmable colorimetry reference 310, a dynamic phase comparator 320, a statistical extractor 330, a memory unit 340 and a statistical rating calculator 350. The dynamic phase comparator 320 receives video signal S5 and compares the chrominance information (i.e., the Cr and Cb color components) within the video signal S5 to chrominance information within a reference signal REF produced by the programmable colorimetry reference 310. The comparison results in a real time difference (error) signal RTD that is coupled to the statistical extractor 330. The statistical extractor 330 extracts, from the RTD signal, statistical information about, e.g., the mean and standard deviations of the chrominance information within video signal S5 from the chrominance reference signal REF. The extracted statistical information is stored in memory unit 360.

The statistical rating calculator 340 utilizes the statistical information stored in memory unit 360 and the real time difference signal RTD to construct a statistical model of the apparent colorimetry of the source video used to produce video signal S5. The constructed model is compared to one or more expected (or possible) colorimetry model(s) using, e.g., a best-fit technique to produce a probability of fitness index. The probability of fitness index provides an indication of the likely source colorimetry of the video signal S5. The probability of fitness index is coupled to an output of the colorimetry processor as the control signal COLOR. It must be noted that the quality (i.e., accuracy) of the fitness index is improved by utilizing a larger sampling of the extracted RID statistics. Such a larger sampling requires, of course, an increase in the capacity of memory unit 340.

The probability of fitness index (i.e., the COLOR signal) may be used by the controller 150 to adapt the color matrix signal MATRIX such that colorimetry anomalies within the video signal S5 are corrected during color matrix processing. Moreover, the amount of colorimetry correction imparted to the video signal S5 maybe controlled in response to the confidence level of the probability of fitness index (i.e., increase correction if certainty of a particular error is increased).

Figure 4:
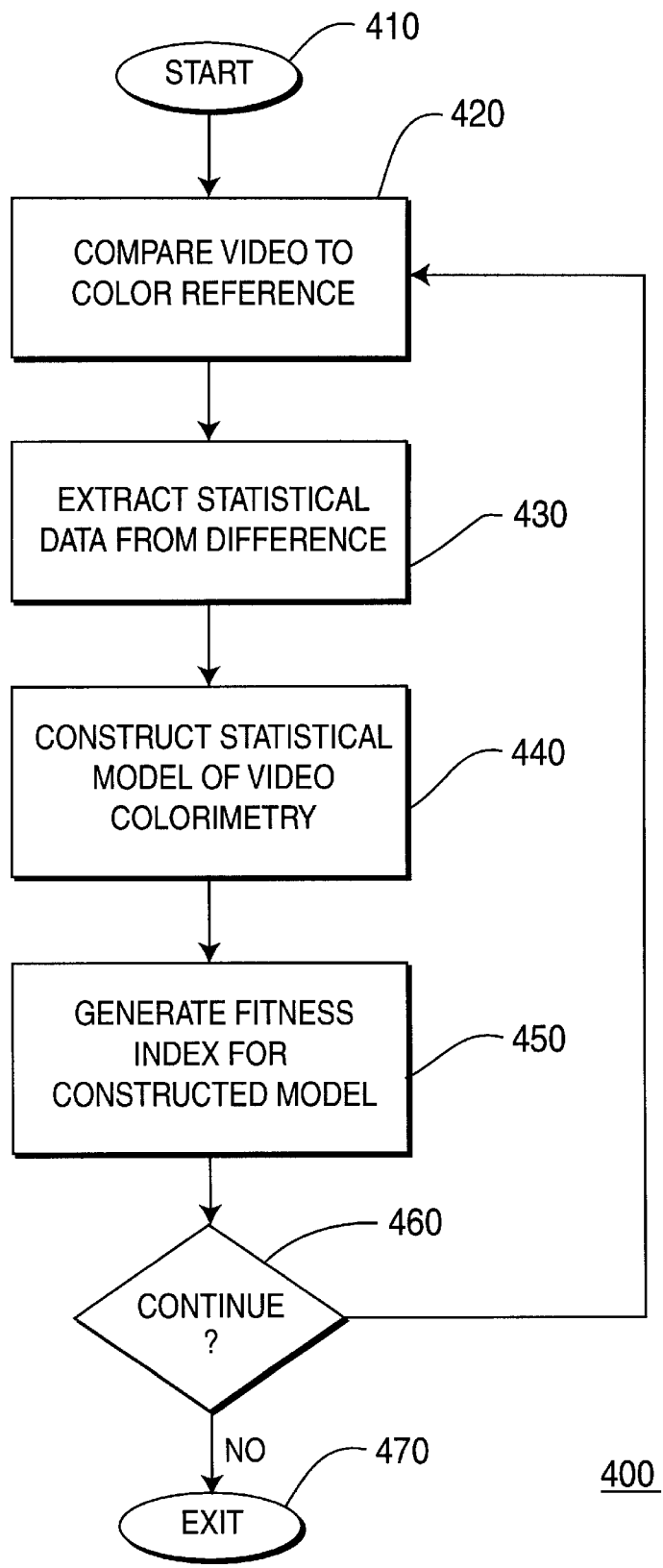
FIG. 4 shows a flow diagram of a colorimetry identification routine according to one embodiment of the invention To facilitate understanding, identical reference numerals have been used, where possible, to designate identical elements that are common to the figures.

FIG. 4 shows a flow diagram of a colorimetry identification routine 400 according to one embodiment of the invention. Specifically, The colorimetry identification routine 400 describes the colorimetry method utilized by the colorimetry processor 180 depicted in FIG. 3. The colorimetry identification routine 400 is entered at step 410, when a video signal is received by, illustratively, the colorimetry processor 180. The colorimetry identification routine 400 proceeds to step 420, where chrominance information within the received video signal is compared to a reference chrominance video signal on a substantially real time basis to produce a difference signal. The colorimetry identification routine 400 then proceeds to step 430, where statistical information about, e.g., the mean and standard deviations of the chrominance information within the video signal S5 is extracted from the difference signal. The colorimetry identification routine 400 then proceeds to step 440, where a statistical model of the apparent colorimetry of the video signal is constructed. The colorimetry identification routine 400 then proceeds to step 450, where the constructed model is compared to pre-defined colorimetry models to generate a fitness index (i.e., a measure of the similarity of the constructed model to one or more of the reference models). The colorimetry identification routine 400 then proceeds to step 460, where a query is made as to whether the routine 400 should continue. If the query is answered negatively, then the routine 400 exits at step 470. If the query is answered positively, then the routine 400 proceeds to repeat steps 420–460. It should be noted that the statistical model constructed at step 440, and the resulting fitness index generated at step 450, will become more accurate as the routine 400 iteratively performs steps 420–450.

The DTV receiver 100 of FIG. 1 is capable of receiving, as previously noted, source video comprising image sequences that vary in spatial resolution (480 lines, 720 lines, or 1080 lines), in temporal resolution (60 fps, 30 fps, or 24 fps), and in scanning format (2:1 interlaced or progressive scan). Thus, the video signal S5 may require format processing to convert the source video format into a display device native format. Such format conversion may be effected using optional sync generator 190.

DTV receiver 100 optionally includes a synchronizing signal generator 190. Sync generator 190 produces horizontal H and vertical V synchronizing signals that are coupled to deflection circuitry (not shown) associated with a display device. Sync generator 190, in response to a control signal SYNC from the controller 150, adjusts the timing characteristics of the horizontal H and vertical V synchronizing signals. The timing characteristics are adjusted to adapt the format of the video signal S5 to the format of the display device. For example, if a 16:9 native format display device is used to display 4:3 aspect ratio video source material, a pre-determined degree of overscan is produced. The sync generator 190, in response to the control signal SYNC from controller 150, causes the 16:9 aspect ratio display device to generate a 4:3 aspect ratio picture between black "side bars," or a 16:9 aspect ratio picture in which the top and bottom of the image is not displayed (i.e., "chopped" off). Similarly, a 4:3 native format display device may be used to display 16:9 aspect ratio source video by, e.g., chopping off the sides of the displayed image. The above-described overscan and chopping operations are known in the art.

The above-described embodiments of the invention provide methods and apparatus that adjust video processor operations, such as horizontal peaking, vertical peaking and colorimetry parameters, depending upon the format of a received video signal. Parameters related to a particular display device may also be used to adapt a received video signal in a multiple video format DTV receiver. For example, a multiple format video signal processing system operating in conjunction with a display device timing system to produce synchronized video and timing signals suitable for use by a fixed horizontal scanning frequency display device is described in more detail in co-pending U.S. patent application Ser. No. 09/001,952, filed on the same day as the present application, and incorporated herein by reference in its entirety. Specifically, a non-standard raster clock having a frequency simply derived from a system clock (e.g., 27 MHz MPEG clock) is used in conjunction with a format converter and a frame rate converter to adapt a video signal to a fixed horizontal frequency display device.

Another example is a method and apparatus for synchronizing frame rate control and format control operations is described in more detail in co-pending U.S. patent application Ser. No. 09/001,596, filed on the same day as the present application, and incorporated herein by reference in its entirety. Specifically, the described method and apparatus utilize electronic format and frame rate conversion in a multiple format video processing system adapted to avoid display motion artifacts causes by 3:2 conversion of 24 Hz video source video by tripling the frame rate of the source video and responsively adjusting the format of the resultant video signal.

Although various embodiments which incorporate the teachings of the present invention have been shown and described in detail herein, those skilled in the art can readily devise many other varied embodiments that still incorporate these teachings.

What is claimed is:

1. A video processing apparatus for processing a plurality of video formats, comprising:
    a video decoder, for decoding a compressed video stream to produce a first video signal and a header information signal, said header information signal comprising at least picture format indicium;
    a controller, coupled to said video decoder, for producing a control signal in response to said header information signal; and
    a video processing circuit, coupled to said video decoder and said controller, for processing said first video signal according to a plurality of processing parameters to produce an output video signal, said video processing circuit, in response to said control signal, modifying at least one of said processing parameters, wherein said video processing circuit comprises a peaking processor, and said at least one of said processing parameters comprises a peaking parameter;
    said peaking processor comprising a horizontal peaking circuit for emphasizing high frequency intra-line luminance information.

2. A video processing apparatus for processing a plurality of video formats, comprising:
    a video decoder, for decoding a compressed video stream to produce a first video signal and a header information signal, said header information signal comprising at least picture format indicium;
    a controller, coupled to said video decoder, for producing a control signal in response to said header information signal;
    a video processing circuit, coupled to said video decoder and said controller, for processing said first video signal according to a plurality of processing parameters to produce an output video signal, said video processing circuit, in response to said control signal, modifying at least one of a color weighting parameter and a gamma correction parameter; and
    a colorimetry processor, coupled to said video decoder and said controller, for measuring a color parameter of one of said first video signal and said header information signal and producing an output signal indicative of said measured color parameter, wherein said colorimetry processor comprises:
    a comparator, for comparing chrominance information within said first video signal to reference chrominance information to produce a difference signal;
    a statistical extractor, coupled to said comparator, for extracting statistical information from said difference signal; and
    a statistical calculator, coupled to said statistical extractor and said comparator, for utilizing said difference signal and said statistical information to construct a statistical model of a colorimetry of said first video signal.

3. The video processing apparatus of claim 2, wherein:
    said statistical calculator compares said statistical model of said colorimetry of said first video signal to one or more reference models to generate a fitness index associated with said statistical model.

4. The video processing apparatus of claim 2, wherein said reference chrominance information is representative of flesh tone chrominance information.

5. The video processing apparatus of claim 2, wherein said colorimetry processor further comprising the step of:
    iteratively refining said statistical model and said fitness index.

6. A video processing apparatus for processing a plurality of video formats, comprising:
    a video decoder, for decoding a compressed video stream to produce a first video signal and a header information signal, said header information signal comprising at least picture format indicium;
    a controller, coupled to said video decoder, for producing a control signal in response to said header information signal;
    a video processing circuit, coupled to said video decoder and said controller, for processing said first video signal according to a plurality of processing parameters to produce an output video signal, said video processing circuit, in response to said control signal, modifying at least one of a color weighting parameter and a gamma correction parameter;
    a conventional television receiver, for receiving an analog television signal and producing therefrom a second video signal; and
    a switch, coupled to said controller at a control input, said video decoder and said conventional television receiver at respective first and second inputs, and said video processing circuit at an output, for coupling, in response to a switch control signal, one of said first and second video signals to said video processing circuit; wherein
    said video processing circuit comprises a color matrix processor, and said at least one of said processing parameters comprises at least one of a color weighting parameter and a gamma correction parameter.

7. A method for processing a video signal to produce color component video signals, said video signal associated with one of a plurality of pixel formats and colorimetry formats, said method comprising the steps of:
    emphasizing, by a predetermined amount, high frequency components of said video signal;
    color matrix processing, according to a predetermined color matrix, said video signal to produce said color component video signals;
    identifying a pixel format associated with said video signal; and
    modifying, in response to said identified pixel format, a controlling parameter for emphasizing the high frequency components of said video signal;
    identifying a colorimetry format associated with said video signal; and
    modifying, in response to said identified colorimetry format, a color matrix parameter of said video signal.

8. The video signal processing method of claim 7, wherein said first step of modifying comprises at least one of the steps of modifying a horizontal peaking operation and a modifying a vertical peaking operation.

9. The video signal processing method of claim 7, wherein said second step of identifying comprises the steps of:
   comparing chrominance information within said video signal to a reference chrominance signal to produce a difference signal;
   extracting, from said difference signal, statistical information related to said difference signal;
   constructing a statistical model of a colorimetry of said video signal; and
   selecting, as said identified colorimetry, a colorimetry having a statistical model most closely matching said statistical colorimetry model.

10. A method for optimally processing a video signal in a television system adapted to receive video signals according to a plurality of pixel formats, said method comprising the steps of:
    identifying a pixel format associated with said video signal;
    identifying a colorimetry format associated with said video signal;
    adapting, in response to said identified pixel format, a first video processing operation normally imparting a predetermined amount a high frequency luminance emphasis to said video signal; and
    modifying, in response to said identified colorimetry format, a second video processing operation normally utilizing a color matrix to produce a plurality of color signals in response to said video signal.

11. The method of claim 10, wherein said second step of identifying comprises the steps of:
    comparing chrominance information within said video signal to a reference chrominance signal to produce a difference signal;
    extracting, from said difference signal, statistical information related to said difference signal;
    constructing a statistical model of a colorimetry of said video signal; and
    generating a fitness index associated with said statistical model.

12. The method of claim 11, wherein said reference chrominance signal is representative of flesh tone chrominance information.

13. The method of claim 11, further comprising the step of:
    iteratively refining said statistical model and said fitness index.

14. The method of claim 11, wherein said identified colorimetry comprises a colorimetry having a statistical model most closely matching said statistical colorimetry model.

15. The apparatus of claim 1, wherein said horizontal peaking circuit comprises:

a first digital filter, for emphasizing said high frequency intra-line luminance components according to a first plurality of filter coefficient values; and a first filter coefficient storage unit, for producing said first plurality of filter coefficient values in response to a control signal.

16. The apparatus of claim 15, wherein said first plurality of filter coefficient values comprises a set of horizontal filter coefficient values, said filter coefficient storage unit storing at least one set of horizontal filter coefficient values, each of said at least one set of horizontal filter coefficient values being associated with a respective video format.

17. The apparatus of claim 15, wherein said peaking processor further comprises a vertical peaking circuit for emphasizing high frequency inter-line luminance information.

18. The apparatus of claim 17, wherein said vertical peaking circuit comprises:
    a second digital filter, for emphasizing said high frequency inter-line luminance components according to a second plurality of filter coefficient values; and
    a second filter coefficient storage unit, for producing said second plurality of filter coefficient values in response to a control signal.

19. The apparatus of claim 18, wherein said second plurality of filter coefficient values comprises a set of vertical filter coefficient values, said second filter coefficient storage unit storing at least one set of vertical filter coefficient values, each of said at least one set of vertical filter coefficient values being associated with a respective video format.

20. The apparatus of claim 17, wherein said peaking processor further comprises a switch, for coupling to an output one of a video signal processed by said horizontal peaking circuit and a video signal processed by said vertical peaking circuit, said video signal processed by vertical peaking circuit only being coupled to said output in the case of said first video signal comprising a non-interlaced video signal.

21. The apparatus of claim 1, wherein said first digital filter comprises one of a finite impulse response (FIR) filter and an infinite impulse response (FIR) filter.

22. The apparatus of claim 9, wherein said second digital filter comprises one of a finite impulse response (FIR) filter and an infinite impulse response (FIR) filter.

23. The method of claim 9, wherein said reference chrominance signal is representative of flesh tone chhrominance information.

24. The method of claim 9, further comprising the step of iteratively refining said statistical model.

25. The method of claim 9, wherein said identified colorimetry comprises a colorimetry having a statistical model most closely matching said statistical colorimetry model.

* * * * *